US010207180B2

(12) United States Patent
Sheil et al.

(10) Patent No.: US 10,207,180 B2
(45) Date of Patent: Feb. 19, 2019

(54) MULTI-PLAYER GAME INPUT WITH DETECTION OF CONTEXT AND PHYSICAL OBJECT USAGE

(71) Applicant: Intel Corporation, Santa Clara, CA (US)

(72) Inventors: Daniel P. Sheil, Portland, OR (US); Glen J. Anderson, Beaverton, OR (US); Mark R. Francis, Portland, OR (US); Ravishankar Iyer, Portland, OR (US); Yevgeniy Y. Yarmosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 14/978,054

(22) Filed: Dec. 22, 2015

(65) Prior Publication Data
US 2017/0173455 A1    Jun. 22, 2017

(51) Int. Cl.
*A63F 9/24* (2006.01)
*A63F 13/235* (2014.01)
*A63F 13/35* (2014.01)
*A63F 13/69* (2014.01)
*A63F 13/211* (2014.01)
*A63F 13/213* (2014.01)
*A63F 13/215* (2014.01)

(52) U.S. Cl.
CPC .......... *A63F 13/235* (2014.09); *A63F 13/211* (2014.09); *A63F 13/213* (2014.09); *A63F 13/215* (2014.09); *A63F 13/35* (2014.09); *A63F 13/69* (2014.09)

(58) Field of Classification Search
None
See application file for complete search history.

(56) References Cited

U.S. PATENT DOCUMENTS

| 6,908,389 | B1 | 6/2005 | Puskala |
| 7,455,590 | B2 | 11/2008 | Hansen et al. |
| 7,568,963 | B1 * | 8/2009 | Atsmon ............... A63H 3/28 446/175 |
| 7,785,197 | B2 | 8/2010 | Smith |
| 2002/0022507 | A1 * | 2/2002 | Dan .................... A63F 9/24 463/1 |
| 2006/0154726 | A1 * | 7/2006 | Weston ............. A63H 30/04 463/37 |

(Continued)

OTHER PUBLICATIONS

International Search Report and Written Opinion for International Patent Application No. PCT/US2016/063265, dated Mar. 8, 2017, 13 pages.

(Continued)

*Primary Examiner* — Paul A D'Agostino
(74) *Attorney, Agent, or Firm* — Jordan IP Law, LLC

(57) ABSTRACT

Systems, apparatuses and methods may provide for determining a state of a multi-player game and identifying a user communication associated with the multi-player game. Additionally, an outbound communication may be generated based on the user communication and the state of the multi-player game. In one example, generating the outbound communication includes conducting a weighted selection of one or more of a recipient, a content or an audio effect of the outbound communication based on the state.

22 Claims, 6 Drawing Sheets

(56) References Cited

U.S. PATENT DOCUMENTS

| | | | | |
|---|---|---|---|---|
| 2006/0160607 A1* | 7/2006 | Okada | ............... | G07F 17/32 463/21 |
| 2007/0015588 A1* | 1/2007 | Matsumoto | ............ | A63F 13/06 463/43 |
| 2007/0097832 A1* | 5/2007 | Koivisto | ............... | A63F 3/08 369/63 |
| 2008/0319252 A1* | 12/2008 | Chapman | ............ | A61M 21/02 600/27 |
| 2010/0033427 A1* | 2/2010 | Marks | ............... | G06F 3/0304 345/156 |
| 2010/0274902 A1* | 10/2010 | Penman | ............... | A63F 13/28 709/227 |
| 2011/0028219 A1* | 2/2011 | Heatherly | ............ | A63H 3/28 463/42 |
| 2011/0294566 A1* | 12/2011 | Cardno | ............... | G07F 17/32 463/25 |
| 2011/0320965 A1* | 12/2011 | Hairman | ............ | A63F 13/47 715/757 |
| 2012/0157206 A1* | 6/2012 | Crevin | ............... | A63F 13/04 463/36 |
| 2012/0295704 A1* | 11/2012 | Reiche | ............... | A63F 13/06 463/31 |
| 2012/0315821 A1* | 12/2012 | Hayakawa | ............ | A63F 13/02 446/297 |
| 2013/0217453 A1* | 8/2013 | Briggs | ............... | G07F 17/32 463/7 |
| 2013/0296058 A1* | 11/2013 | Leyland | ............ | A63F 13/95 463/42 |
| 2014/0179439 A1 | 6/2014 | Miura et al. | | |
| 2015/0273344 A1 | 10/2015 | Kruglick | | |

OTHER PUBLICATIONS

International Preliminary Report on Patentability for International Patent Application No. PCT/US2016/063265, dated Jul. 5, 2018, 9 pages.

* cited by examiner

US 10,207,180 B2

1

MULTI-PLAYER GAME INPUT WITH DETECTION OF CONTEXT AND PHYSICAL OBJECT USAGE

TECHNICAL FIELD

Embodiments generally relate to multi-player games. More particularly, embodiments relate to multi-player game input with detection of context and physical object usage.

BACKGROUND

Online multi-player games may enable individuals (e.g., players) to compete with one another from different geographic locations. In a typical game scenario, each player may operate a handheld game controller while viewing a display. Some games may also provide players with the ability to send instant messages and other text-based communications to one another by typing on a keyboard connected to the game console. The process of typing instant messages, however, while holding a separate game controller may be physically awkward, challenging and/or inconvenient to the game player (e.g., gamer).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
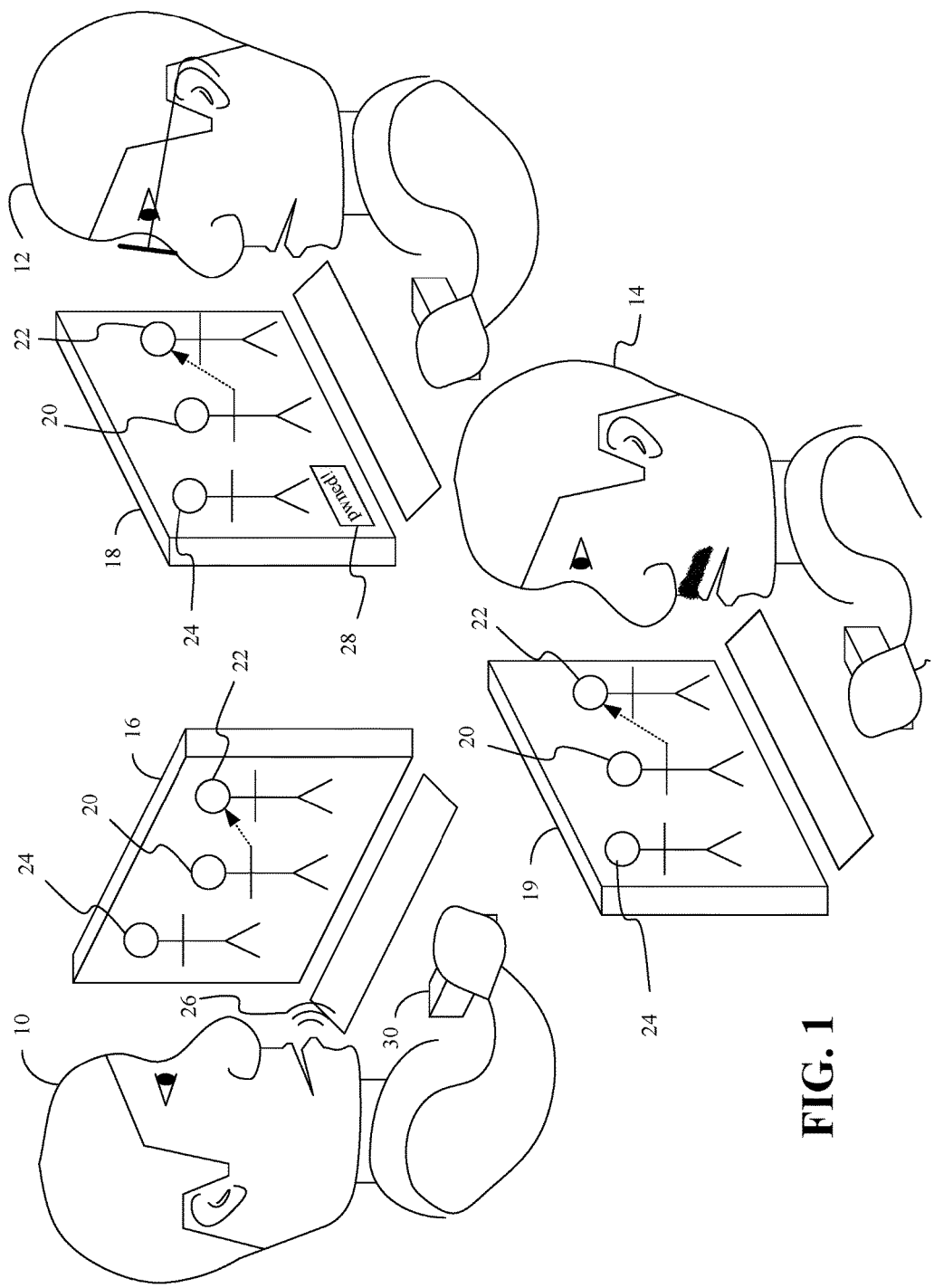
FIG. 1 is an illustration of an example of a multi-player game setting according to an embodiment.

Turning now to FIG. 1, an multi-player game setting is shown in which a first user 10 (e.g., individual, player), a second user 12, and a third user 14 concurrently participate and/or compete in an online game or other virtual environment that is visually presented on a first display 16, a second display 18 and a third display 19, respectively. The users 10, 12, 14 may be located in different physical locations (e.g., different rooms, cities and/or countries) so that the users 10, 12, 16 may be unable to speak directly to one another during participation in the game. In the illustrated example, various characters in the game may correspond to particular players. As will be discussed in greater detail, the state of the multi-player game and other contextual information may be used to conduct text-based communications (e.g., instant messaging/IM, emoticons, etc.) between the users 10, 12, 14 in a hands-free or otherwise abbreviated matter. More particularly, recipients, content, visual element (e.g., player images), tactile effects, audio effects and other attributes of communications may be automatically determined based on the state of the multi-player game.

For example, a first character 20 in the game may correspond to the first user 10, a second character 22 in the game may correspond to the second user 12, a third character 24 in the game may correspond to the third user 14, and so forth. In such a case, when a player-specific event takes place such as, for example, the first character 20 striking the second character 22 (as shown by the dashed arrow), an utterance 26 spoken by the first user 10 may be automatically routed to the second user 12 in the form of a textual outbound communication 28 (e.g., "pwned!" IM) that is presented on the second display 18 being viewed by the second user 12. Thus, it may be inferred from the striking of the second character 22 in the game that the first user 10 is speaking to the second user 12 during the utterance 26, wherein that inferential determination may be used to automatically select the recipient of the outbound communication 28. Of particular note is that the first user 10 may continue to hold a game controller 30 during the utterance 26 without pausing play to type on a nearby keyboard 32.

Moreover, the content of the outbound communication 28 may be automatically selected and/or determined based on the state of the multi-player game. For example, speech recognition techniques may learn and/or apply different dictionary weights based on the striking action made by the first character 20 as well as the identity of the first user 10. Thus, if the actual utterance 26 is "You've been p-owned!" (colloquially meaning beaten or "owned"), the game system may automatically determine that there is a relatively high confidence in the prediction that the corresponding text is "pwned" (or other jargon). If the outbound communication 28 is transmitted in another format such as, for example, sound or vibration, other attributes such as tactile or audio effects (e.g., voices, accents) may also be selected based on the state of the multi-player game.

Figure 2A:
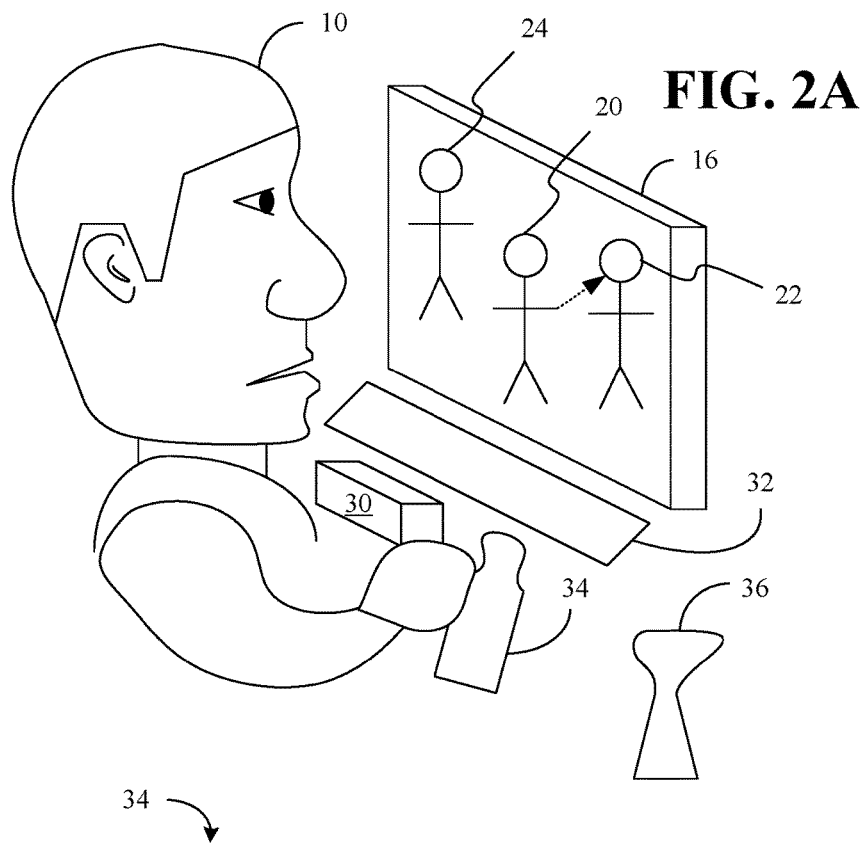
FIG. 2A is an illustration of an example of a multi-player game setting involving figurines according to an embodiment.

FIG. 2A demonstrates that one or more physical objects 34, 36 (e.g., figurines having action figure, ornamental and/or decorative housings) may also be used to conduct communications between users in a multi-player game. In the illustrated example, one physical object 34 corresponds to the second character 22 in the game and another physical object 36 corresponds to the third character 24 in the game. The physical objects 34, 36 may be paired (e.g., via Bluetooth, Institute of Electrical and Electronics Engineers/IEEE 802.15.1-2005, Wireless Personal Area Networks) with a system hosting the multi-player game. When the game launches, the system may identify the paired objects 34, 36 and assign them to other players in the game. Thus, the first user 10 may make a gesture with the physical object 34 immediately after the first character 20 strikes the second character 22. In such a case, the gesture input may be captured via a camera, motion sensor, etc. (not shown) and recognized as an attempted user communication that may be converted into an outbound communication such as, for example, the outbound communication 28 (FIG. 1). Although the first user 10 removes a hand from the game controller 30 in the illustrated example, the use of the physical objects 34, 36 during game play may substantially enhance the user experience in terms of excitement and/or enjoyment. Other user communications such as, for example, facial image input (e.g., facial expressions), touch input (e.g., touch pad/screen taps), etc., may be automatically converted into outbound communications.

Thus, physical objects/figurines may be used to enable communication with team members and opponents. For example, in match-based game, a first player may be competing against a second player using a particular character. The first player may have a figurine of the particular character that the first player touches or shakes to message the second player in the game. Shaking/gesturing with the figurine may create the message, or the movement of the figurine may simply indicate which player online should receive the next voice-to-text message. If the figurine has additional compute intelligence, then the player may instruct the figurine to jump or move, without the player manually doing so himself or herself. In this case, the message to the figurine triggers an action that in turn triggers a message to another player in the game.

Moreover, inbound communications/messages from other users such as, for example, the second and third users 12, 14 (FIG. 1) may also be output to the first user 10 via the physical objects 34, 36. The sound/images of messages sent and received by players may physically come from the figurines. The figurine might display text or speak the message sent. Additionally, acknowledgement of the message from the person receiving the message may be made by the recipient physically moving a figurine or making a gesture.

In addition, if a player has a figurine, then the message sent may take on the personality of the figurine. Word choice accent, speech patterns, etc., may be consistent with those of the character being played, as opposed to in the voice/sound of the human game player. This audio effect may add an element of delight to the game and enhance the value of the characters.

In another example, a separate utensil or tool may be recognizable (e.g., by a camera based on distinctive colors or shapes), wherein the player wields the utensil or tool to make contact with a figurine associated with another player. This contact may then trigger a message. For example, hitting another player's figurine with a small hammer might result in a message such as "I'm going to crush you!" In another example, a small brush might send a message such as "Move out of the way". The player may customize the message associated with each tool.

The figurine gestures may also improve automatic speech-to-text recognition (ASR) accuracy. For example, if the figurine is idle, ASR may assume a neutral message or warning (e.g., "Watch out!"). If the figurine turns to the right, a message of positive encouragement (e.g., "Good Job!") may be sent. If the figurine turns to left, a negative message (e.g., "Boo!") may be generated. In this case, the player speaks the message to send, but the general player intent is determined based on the figurine gesture combined with other context elements.

Thus, having a figurine associated with a character on the opposing team may be used to send specific messages (e.g., touching the figurine may generate message "Watch out for [this character]!" or "Let's jointly attack it"). Additionally, in response to determining that a figurine has been touched, the game may display data about the opponent (weaknesses, rating, lives left).

Figure 2B:
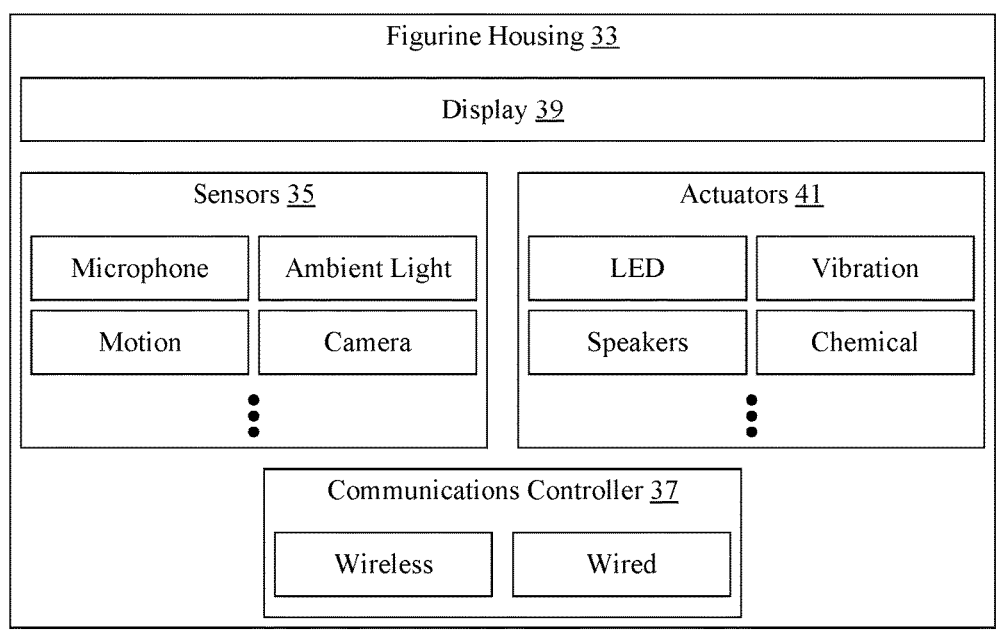
FIG. 2B is a block diagram of an example of a figurine according to an embodiment.

FIG. 2B shows one example of the physical object 34 in greater detail. The physical object 34, which has a figurine housing 33 (e.g., with an action figure, ornamental and/or decorative appearance), may generally be used to receive/capture user communications as well as output inbound communications. More particularly, the illustrated figurine housing 33 includes one or more sensors 35 such as, for example, a microphone, ambient light sensor, motion sensor, camera, etc., that may be used to detect speech input, gesture input, facial image input, touch input, and so forth. A communications controller 37 may transmit (e.g., via wireless and/or wired communication) the detected input to a game controller or other suitable platform. Additionally, inbound communications may be received via the communications controller 37 and output via a display (e.g., liquid crystal display/LCD, organic light emitting diode/OLED display) 39 and/or one or more actuators 41 (e.g., LEDs, vibration/haptic components, speakers, chemical/scent actuators, etc.).

Figure 3:
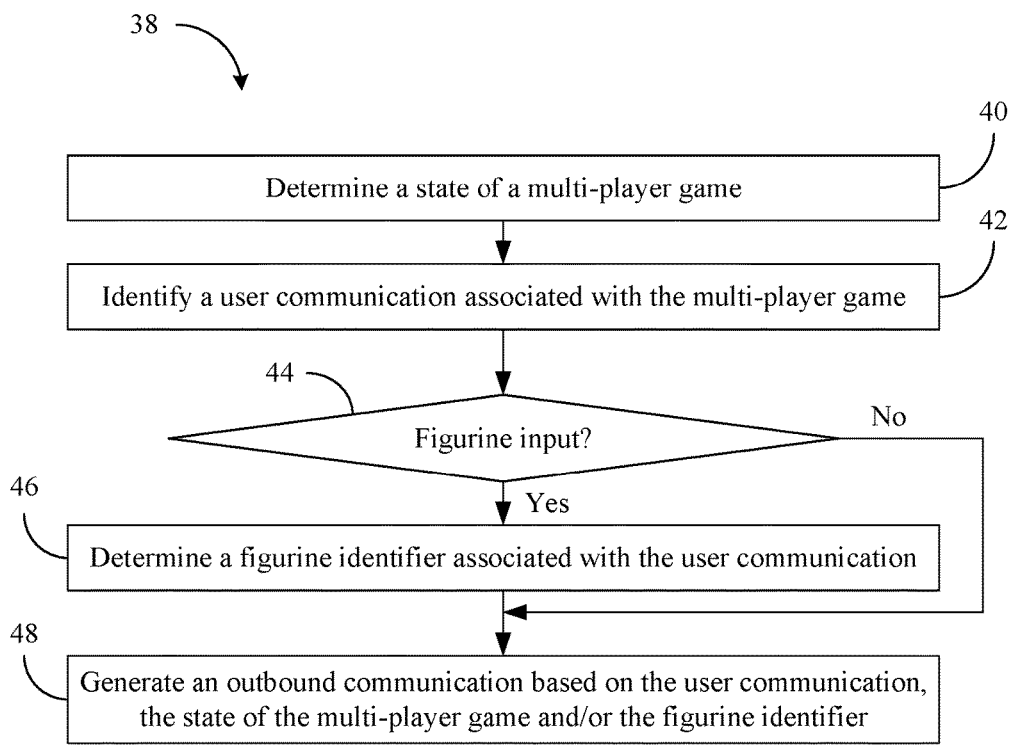
FIG. 3 is a flowchart of an example of a method of conducting outbound communications according to an embodiment.

FIG. 3 shows a method 38 of conducting outbound communications in a multi-player game. The method 38 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 38 may be written in any combination of one or more programming languages, including an object oriented programming language such as JAVA, SMALLTALK, C++ or the like and conventional procedural programming languages, such as the "C" programming language or similar programming languages.

Illustrated processing block 40 determines a state of a multi-player game. Block 40 may include detecting one or more player-specific events. Block 42 may identify a user communication (e.g., locally generated) associated with the multi-player game, wherein the user communication may include, for example, a speech input, a gesture input, a facial image input, a touch input, and so forth. A determination may be made at block 44 as to whether the user communication was received via a figurine. If so, block 46 determines a figurine identifier associated with the user communication. The figurine identifier might be, for example, a radio frequency identifier (RFID) tag, barcode, quick response (QR) code or other suitable identifier that is transmitted from and/or displayed on a figurine such as the physical objects 34, 36 (FIG. 2). In one example, the figurine identifier corresponds to a player and/or character in the multi-player game.

Illustrated block 48 generates an outbound communication based on the user communication, the state of the multi-player game and the figurine identifier (if the user communication was received via a figurine). Block 48 may include conducting a weighted selection of a recipient, content, visual element, tactile effect, audio effect, etc., or any combination thereof, of the outbound communication based on the state. The weighted selection may involve making one match to a particular communication more likely than another, using jargon common in multi-player games as it relates to a detected event and a correlating communication, and so forth. For example, block 48 might involve selecting player-specific and/or event-specific jargon as the content of the outbound communication, wherein the selected jargon has been assigned the greatest weight relative to other potential words, passages and/or phrases. Similar weighted selections may be made among different recipients (e.g., with the selected recipient being associated with the greatest weight), different visual elements (e.g., with the selected visual element being associated with the greatest weight), etc. If the user communication was not received via a figurine, block 46 may be bypassed and block 48 may generate the outbound communication based on the user communication and the state of the multi-player game.

Figure 4:
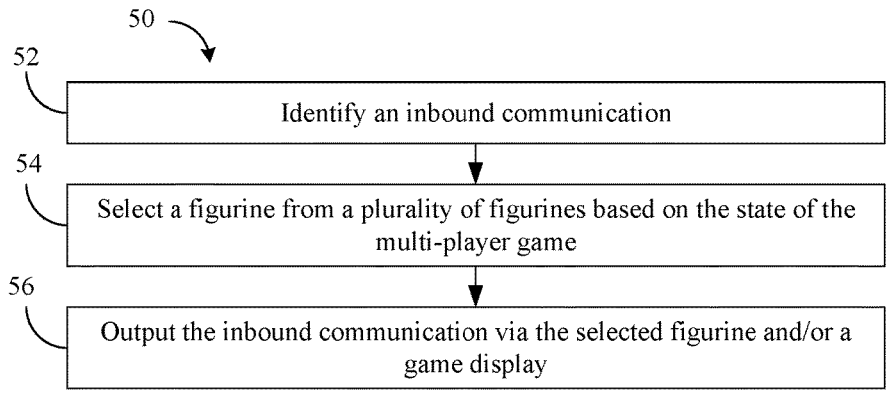
FIG. 4 is a flowchart of an example of a method of conducting inbound communications according to an embodiment.

FIG. 4 shows a method 50 of conducting inbound communications in a multi-player game. The method 50 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 52 provides for identifying an inbound communication, wherein a figurine may be selected from a plurality of figurines at block 54 based on the state of the multi-player game. For example, if the inbound communication is received from a particular player in the game, block 54 may include selecting a figurine that corresponds to the particular player. Block 56 may output the inbound communication via the selected figurine. Block 56 may include presenting a textual version of the inbound communication on a display of the selected figurine, sending an audible version of the inbound communication to a speaker of the selected figurine, vibrating the selected figurine, and so forth.

Figure 5:
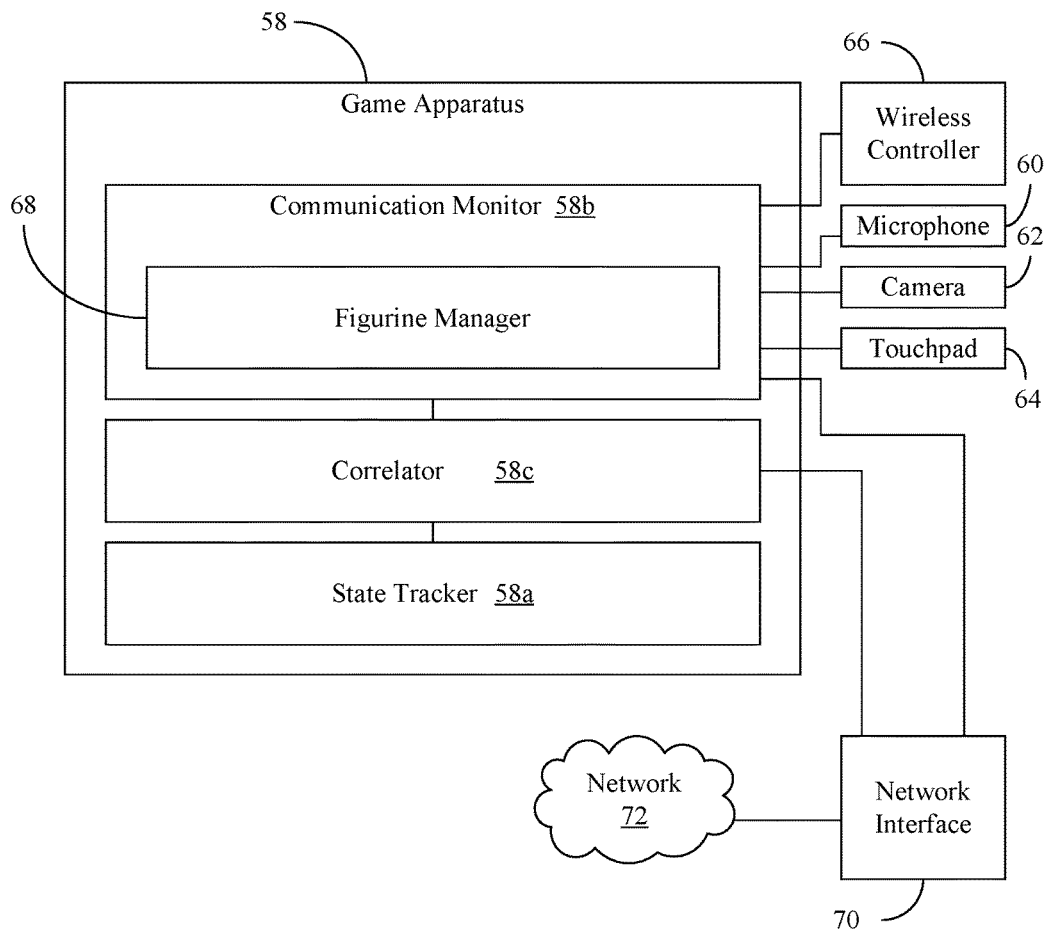
FIG. 5 is a block diagram of an example of a game apparatus according to an embodiment.

Turning now to FIG. 5, a game apparatus 58 (58a-58c) is shown. The game apparatus 58 may generally implement one or more aspects of the method 38 (FIG. 3) and/or the method 50 (FIG. 4), already discussed. The game apparatus 58 may therefore include software logic instructions, configurable logic, fixed-functionality hardware logic, etc., or any combination thereof. In the illustrated example, the apparatus 58 includes a state tracker 58a to determine a state of a multi-player game. The state tracker 58a may detect, for example, one or more player-specific events to determine the state of the multi-player game. Thus, the state tracker 58a might search and/or monitor a database, log, metadata file, register or other source that documents the state of the game.

Additionally, a communication monitor 58b may identify a user communication associated with the multi-player game. The user communication might include speech input received via a microphone 60, gesture input recorded via a camera 62 and/or motion sensor (not shown), facial gesture input recorded via the camera 62, touch input received via a touchpad 64, and so forth. The user communication may also be received from one or more figurines (not shown) via a wireless controller 66 such as a Bluetooth radio or RFID transponder. In this regard, the communication monitor 58b may include a figurine manager 68 to determine a figurine identifier associated with the user communication, wherein the figurine identifier corresponds to a player in the multi-player game.

The illustrated apparatus 58 also includes a correlator 58c communicatively coupled to the state tracker 58a and the communication monitor 58b, wherein the correlator 58c generates an outbound communication based on the user communication and the state of the multi-player game. More particularly, the correlator 58c may conduct a weighted selection of one or more of a recipient, a content, a visual element, a tactile effect or an audio effect of the outbound communication based on the state. The outbound communication may also be generated based on the figurine identifier if the figurine manager 68 determines that the user communication was received via a figurine. In one example, the game apparatus 58 sends the outbound communication to the recipient via a network interface 70 and/or a network 72 (e.g., the Internet).

The game apparatus 58 may also receive an inbound communication from the network interface 70 and/or network 72, wherein the communication monitor 58b may identify the inbound communication and optionally output the inbound communication via a figurine. If the inbound communication is output via the figurine, the figurine manager 68 may select the figurine from a plurality of figurines. For example, if a sender of the inbound communication has an associated figurine, that figurine may be selected. In another example, the figurine manager selects the figurine based on the state of the multi-player game. Thus, if a character corresponding to the local player was recently struck by a character corresponding to another particular player, the figurine manager 68 might select the figurine corresponding to the other particular player (e.g., even if the other particular player is not using a system with enhanced communication functionality as described herein). The inbound communication may also be presented on a local display. One or more of the illustrated components of the game apparatus 58 may be implemented as an application programming interface (API) that is separate from the local instance of the multi-player game.

Accordingly, recent character actions and other events in the online game may make certain words and phrases more likely, which may be applied to enhance dictionary weightings. For example, if a player just made a successful maneuver, the player might say "you've been pwned", and the system would be more likely to use "pwned" (with that spelling) immediately after such an event rather than when the player is simply chatting with someone without making a special maneuver. The system may learn what phrases are commonly used by various players or characters, quickly access such phrases/words when the message is created and send the phrases/words in a manner that decreases processing resources and reduces latencies.

As already noted, depending on a recent event, a message may be more likely directed toward one player than another. For example, if a player says "nice shot," the system may by default send the comment to a player who just blew something up. In a team based game, the apparatus 58 may be intelligent enough to know which team performed the action being mentioned. The apparatus 58 may also determine which player or character made the action and therefore automatically personalize the outbound message, without requiring additional manual text entry by the player. The player may simply press an enter key to send the message (or toggle the recipient if the attribution is incorrect). Alternatively, the player may verbalize the command "send to player X" to direct and send the message in order to keep the player's hands on the game controller.

The message may be generated automatically due to specific actions in the game rather than manual messages initiated by the user. For example, anytime a particular character is attacked more than X times, the game apparatus 58 may generate an outbound communication such as "take that". The outbound communication may be visually displayed or output as audio in the receiving figurine. Additionally, in order to obviate concerns over player abuse, natural language processing (NLP) may be used to block offensive communications. NLP may also be used to allow the system to make appropriate determinations about verbal utterances in relation to the game.

Figure 6:
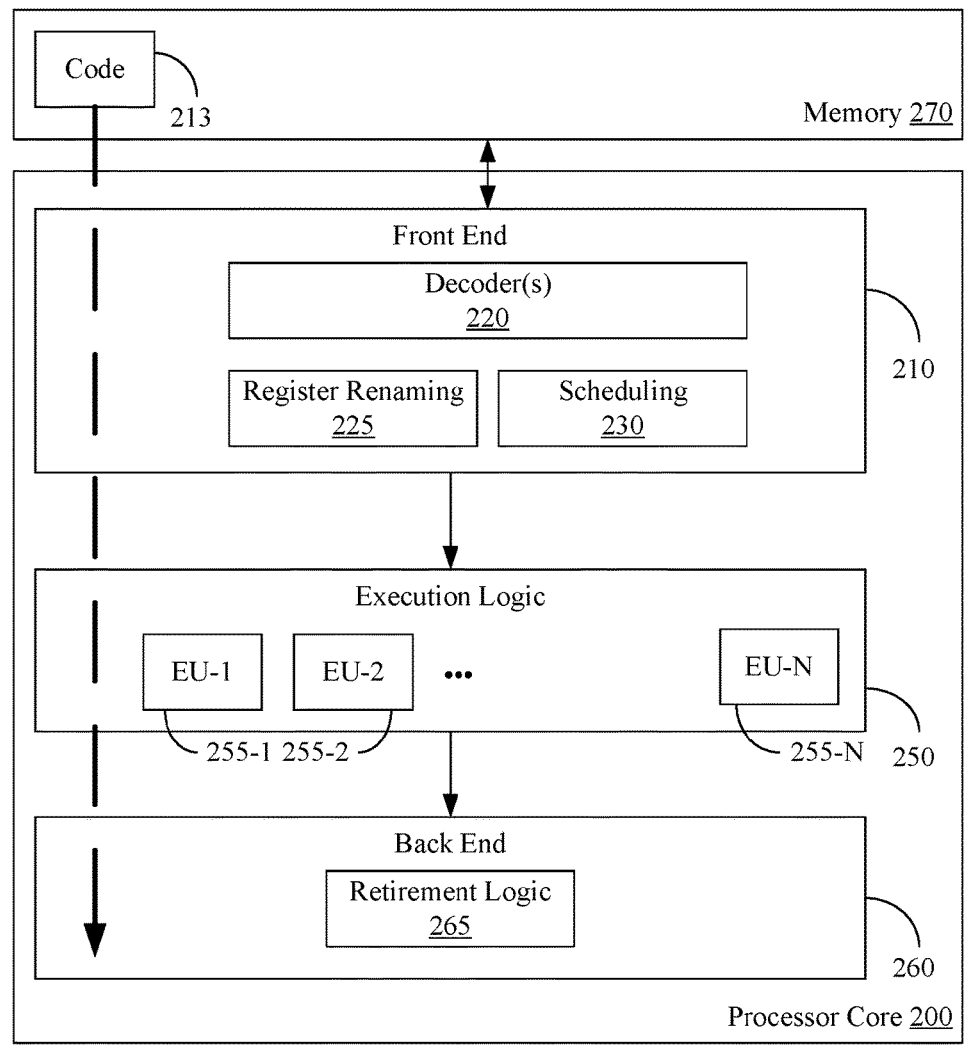
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 38 (FIG. 3) and/or the method 50 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
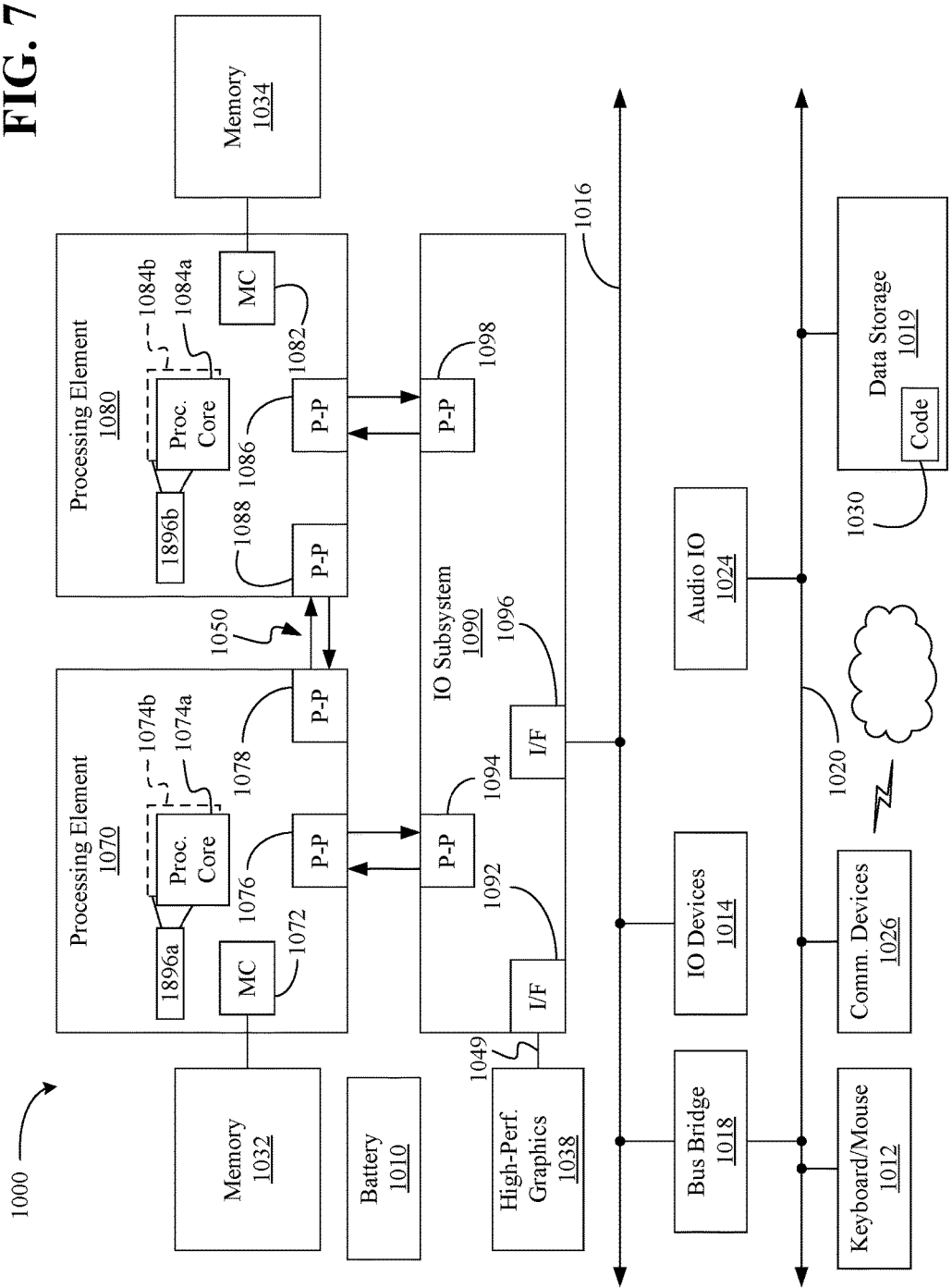
FIG. 7 is a block diagram of an example of a computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 38 (FIG. 3) and/or the method 50 (FIG. 4), already discussed, and may be similar to the code 213 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

ADDITIONAL NOTES AND EXAMPLES

Example 1 may include a game apparatus comprising a state tracker to determine a state of a multi-player game, a communication monitor to identify a user communication associated with the multi-player game, and a correlator communicatively coupled to the state tracker and the communication monitor, the correlator to generate an outbound communication based on the user communication and the state of the multi-player game.

Example 2 may include the apparatus of Example 1, wherein the correlator is to conduct a weighted selection of one or more of a recipient, a content, a visual element, a tactile effect or an audio effect of the outbound communication based on the state.

Example 3 may include the apparatus of Example 1, wherein the communication monitor further includes a figurine manager to determine a figurine identifier associated with the user communication, wherein the outbound communication is to be generated further based on the figurine identifier.

Example 4 may include the apparatus of Example 3, wherein the figurine identifier is to correspond to a player in the multi-player game and the user communication is to be received at least in part via the figurine.

Example 5 may include the apparatus of Example 1, wherein the user communication is to include one or more of a speech input, a gesture input, a facial image input or a touch input.

Example 6 may include the apparatus of Example 1, further including a figurine, wherein the communication monitor includes a figurine manager to identify an inbound communication and output the inbound communication via one or more of the figurine or a display.

Example 7 may include the apparatus of Example 6, wherein the figurine manager is to select the figurine from a plurality of figurines based on the state of the multi-player game.

Example 8 may include the apparatus of Example 6, wherein the figurine includes one or more of a sensor, an actuator, a display or a communications controller.

Example 9 may include the apparatus of any one of Examples 1 to 8, wherein the state tracker is to detect one or more player-specific events to determine the state of the multi-player game.

Example 10 may include a method of conducting communications in a multi-player game, comprising determining a state of the multi-player game, identifying a user communication associated with the multi-player game, and generating an outbound communication based on the user communication and the state of the multi-player game.

Example 11 may include the method of Example 10, wherein generating the outbound communication includes conducting a weighted selection of one or more of a recipient, a content, a visual element, a tactile effect or an audio effect of the outbound communication based on the state.

Example 12 may include the method of Example 10, further including determining a figurine identifier associated with the user communication, wherein the outbound communication is generated further based on the figurine identifier.

Example 13 may include the method of Example 12, wherein the figurine identifier corresponds to a player in the multi-player game and the user communication is received at least in part via the figurine.

Example 14 may include the method of Example 10, wherein the user communication includes one or more of a speech input, a gesture input, a facial image input or a touch input.

Example 15 may include the method of Example 10, further including identifying an inbound communication, and outputting the inbound communication via one or more of a figurine or a display.

Example 16 may include the method of Example 15, further including selecting the figurine from a plurality of figurines based on the state of the multi-player game.

Example 17 may include the method of any one of Examples 10 to 16, wherein determining the state of the multi-player game includes detecting one or more player-specific events.

Example 18 may include at least one computer readable storage medium comprising a set of instructions, which when executed by a computing device, cause the computing device to determine a state of a multi-player game, identify a user communication associated with the multi-player game, and generating an outbound communication based on the user communication and the state of the multi-player game.

Example 19 may include the at least one computer readable storage medium of Example 18, wherein the instructions, when executed, cause a computing device to conduct a weighted selection of one or more of a recipient, a content, a visual element, a tactile effect or an audio effect of the outbound communication based on the state.

Example 20 may include the at least one computer readable storage medium of Example 18, wherein the instructions, when executed, cause a computing device to determine a figurine identifier associated with the user communication, and wherein the outbound communication is to be generated further based on the figurine identifier.

Example 21 may include the at least one computer readable storage medium of Example 20, wherein the figurine identifier is to correspond to a player in the multi-player game and the user communication is to be received at least in part via the figurine.

Example 22 may include the at least one computer readable storage medium of Example 18, wherein the user communication is to include one or more of a speech input, a gesture input, a facial image input or a touch input.

Example 23 may include the at least one computer readable storage medium of Example 18, wherein the instructions, when executed, cause a computing device to identify an inbound communication, and output the inbound communication via one or more of a figurine or a display.

Example 24 may include the at least one computer readable storage medium of Example 23, wherein the instructions, when executed, cause a computing device to select the figurine from a plurality of figurines based on the state of the multi-player game.

Example 25 may include the at least one computer readable storage medium of any one of Examples 18 to 24, wherein the instructions, when executed, cause a computing device to detect one or more player-specific events to determine the state of the multi-player game.

Example 26 may include a game apparatus comprising means for determining a state of the multi-player game, means for identifying a user communication associated with the multi-player game, and means for generating an outbound communication based on the user communication and the state of the multi-player game.

Example 27 may include the apparatus of Example 26, wherein the means for generating the outbound communication includes means for conducting a weighted selection of one or more of a recipient, a content, a visual element, a tactile effect or an audio effect of the outbound communication based on the state.

Example 28 may include the apparatus of Example 26, further including means for determining a figurine identifier associated with the user communication, wherein the outbound communication is generated further based on the figurine identifier.

Example 29 may include the apparatus of Example 28, wherein the figurine identifier is to correspond to a player in the multi-player game and the user communication is to be received at least in part via the figurine.

Example 30 may include the apparatus of Example 26, wherein the user communication is to include one or more of a speech input, a gesture input, a facial image input or a touch input.

Example 31 may include the apparatus of Example 26, further including means for identifying an inbound communication, and means for outputting the inbound communication via one or more of a figurine or a display.

Example 32 may include the apparatus of Example 31, further including means for selecting the figurine from a plurality of figurines based on the state of the multi-player game.

Example 33 may include the apparatus of any one of Examples 26 to 32, wherein the means for determining the state of the multi-player game includes means for detecting one or more player-specific events.

Thus, techniques described herein may track states of a multi-player game in order to influence the weighted recognition of communication to be sent to other players. Communications may be text messages or images that result from speech recognition, natural language recognition, gesture input (e.g., gesture with an object detected by motion sensors, gesture made with a hand detected by a camera), touch input, face recognition, and so forth. Accordingly, a more efficient solution to sending messages may be achieved by reducing and/or eliminating typing during game play. Because the player may therefore remain more visually and manually engaged in the game, player performance may be improved.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   a multi-player gaming device including:
   a state tracker to determine a state of a multi-player game, wherein the state tracker is to detect one or more player-specific events to determine the state of the multi-player game;
   a communication monitor to identify a user communication associated with the multi-player game, wherein the communication monitor is to determine that the user communication is provided in response to the one or more player-specific events to identify the user communication as being associated with the one or more player-specific events; and
   a correlator communicatively coupled to the state tracker and the communication monitor, the correlator to automatically generate an outbound communication based on the user communication and the state of the multi-player game, wherein the correlator is to adjust weights based on the one or more player-specific events to conduct a weighted selection of one or more of a recipient, a content, a visual element, a tactile effect or an audio effect of the outbound communication to automatically convert the user communication into the outbound communication.

2. The apparatus of claim 1, wherein the communication monitor further includes a figurine manager to determine a figurine identifier associated with the user communication, wherein the outbound communication is to be generated further based on the figurine identifier.

3. The apparatus of claim 2, wherein the figurine identifier is to correspond to a player in the multi-player game and the user communication is to be received at least in part via a figurine associated with the figurine identifier.

4. The apparatus of claim 1, wherein the user communication is to include one or more of a speech input, a gesture input, a facial image input or a touch input.

5. The apparatus of claim 1, further including a figurine, wherein the communication monitor includes a figurine manager to identify an inbound communication and output the inbound communication via one or more of the figurine or a display.

6. The apparatus of claim 5, wherein the figurine manager is to select the figurine from a plurality of figurines based on the state of the multi-player game.

7. The apparatus of claim 5, wherein the figurine includes one or more of a sensor, an actuator, a display or a communications controller.

8. A method comprising:
   determining, by a multi-player gaming device, a state of a multi-player game by detecting one or more player-specific events;
   identifying, by the multi-player gaming device, a user communication associated with the multi-player game by determining that the user communication is provided in response to the one or more player-specific events; and
   automatically generating, by the multi-player gaming device, an outbound communication based on the user communication and the state of the multi-player game, wherein the automatically generating includes automatically converting the user communication into the outbound communication by
   adjusting weights based on the one or more player-specific events, and
   conducting a weighted selection of one or more of a recipient, a content, a visual element, a tactile effect or an audio effect of the outbound communication based on the adjusted weights.

9. The method of claim 8, further including determining a figurine identifier associated with the user communication, wherein the outbound communication is generated further based on the figurine identifier.

10. The method of claim 9, wherein the figurine identifier corresponds to a player in the multi-player game and the user communication is received at least in part via a figurine associated with the figurine identifier.

11. The method of claim 8, wherein the user communication includes one or more of a speech input, a gesture input, a facial image input or a touch input.

12. The method of claim 8, further including:
    identifying an inbound communication; and
    outputting the inbound communication via one or more of a figurine or a display.

13. The method of claim 12, further including selecting the figurine from a plurality of figurines based on the state of the multi-player game.

14. At least one computer readable storage medium comprising a set of instructions, which when executed by a multi-player game computing device, cause the computing device to:
    detect one or more player-specific events to determine a state of a multi-player game;
    identify a user communication associated with the multi-player game, wherein the user communication is determined to be provided in response to the one or more player-specific events to identify the user communication as being associated with the one or more player-specific events; and
    automatically generate an outbound communication based on the user communication and the state of the multi-player game, wherein the computing device is to adjust weights based on the one or more player-specific events to conduct a weighted selection of one or more of a recipient, a content, a visual element, a tactile effect or an audio effect of the outbound communication to automatically convert the user communication into the outbound communication.

15. The at least one computer readable storage medium of claim 14, wherein the instructions, when executed, cause a computing device to determine a figurine identifier associated with the user communication, and wherein the outbound communication is to be generated further based on the figurine identifier.

16. The at least one computer readable storage medium of claim 15, wherein the figurine identifier is to correspond to a player in the multi-player game and the user communication is to be received at least in part via a figurine associated with the figurine identifier.

17. The at least one computer readable storage medium of claim 14, wherein the user communication is to include one or more of a speech input, a gesture input, a facial image input or a touch input.

18. The at least one computer readable storage medium of claim 14, wherein the instructions, when executed, cause a computing device to:
    identify an inbound communication; and
    output the inbound communication via one or more of a figurine or a display.

19. The at least one computer readable storage medium of claim 18, wherein the instructions, when executed, cause a computing device to select the figurine from a plurality of figurines based on the state of the multi-player game.

20. The apparatus of claim 1, wherein:
the user communication is to include a speech input,
based on the one or more player-specific events, the correlator is to modify dictionary weights, and
the correlator is to convert the user communication into the outbound communication based on the modified dictionary weights.

21. The apparatus of claim 1, wherein to select the recipient of the outbound communication, the correlator is to assign recipient weights to a plurality of recipients, and conduct the weighted selection to select, as the recipient of the outbound communication, one of the recipients having a greatest recipient weight out of the recipient weights.

22. The apparatus of claim 1, wherein the correlator is to:
assign characteristic weights to a plurality of potential characteristics associated with the outbound communication based on the one or more player-specific events, and
conduct the weighted selection to
select a characteristic out of the characteristics, that is assigned a greatest characteristic weight out of the characteristic weights, to be one or more of the recipient, the content, the visual element, the tactile effect or the audio effect of the outbound communication, and
omit one or more of the other characteristics, each being assigned a smaller one of the characteristic weights that is smaller than the greatest characteristic weight, from being included in the outbound communication.

* * * * *